Nov. 19, 1957     J. HOHL     2,813,582
TUBE CUTTING MACHINE

Filed Dec. 10, 1954     2 Sheets-Sheet 1

INVENTOR
JOHN HOHL
BY
ATTORNEYS

United States Patent Office 2,813,582
Patented Nov. 19, 1957

2,813,582

TUBE CUTTING MACHINE

John Hohl, Toledo, Ohio, assignor to Owens-Illinois Glass Company, a corporation of Ohio Application December 10, 1954, Serial No. 474,313

9 Claims. (Cl. 164—69)

The present invention relates to machines for cutting tubes into short lengths or rings adapted for use as sealing gaskets and for other purposes. The tubes may consist of rubber or rubber-like material.

Such gaskets are extensively used as sealing gaskets in closure caps for bottles, jars, and other containers. When so used, accuracy and uniformity as to size, shape, and thickness are essential and must be within close tolerances. For practical purposes a machine for cutting such gaskets must operate rapidly and produce a large output. An object of the present invention is to provide a machine which meets these requirements.

As herein shown the machine is of the type in which the tubes which are to be cut are mounted on cores or mandrels. The mandrels are rotated during the cutting operation. Cutters for severing each tube into rings or gaskets are arranged in spiral series on a rotating cutter drum parallel with the rotating mandrel. Rotation of the drum causes the individual cutters to sever the rings or gaskets in succession. In this type of machine the engagement of the cutters with the tubes applies more or less force to the tube tending to move it lengthwise of the mandrel and thus preventing uniformity and accuracy in the severed rings or gaskets. An object of the present invention is to overcome this difficulty.

In the preferred form herein disclosed the cutters are arranged in spiral series or rows extending circumferentially of the cutter drum. Each bank of cutters comprises two of such spiral series or rows arranged in a V-formation. A plurality of such formations are arranged side by side in such manner that during a single rotation of the cutter drum the entire tube, extending substantially the full length of the cutter drum, is cut into individual gaskets all of equal size or thickness.

The present application discloses subject matter described and claimed in my copending application Serial Number 398,349, filed December 15, 1953, Ring Gasket Cutting Machine, now Patent No. 2,785,750, issued March 19, 1957. The present invention relates particularly to the mounting and arrangement to the cutters on the cutter drum.

Referring to the accompanying drawings.

Figure 1:
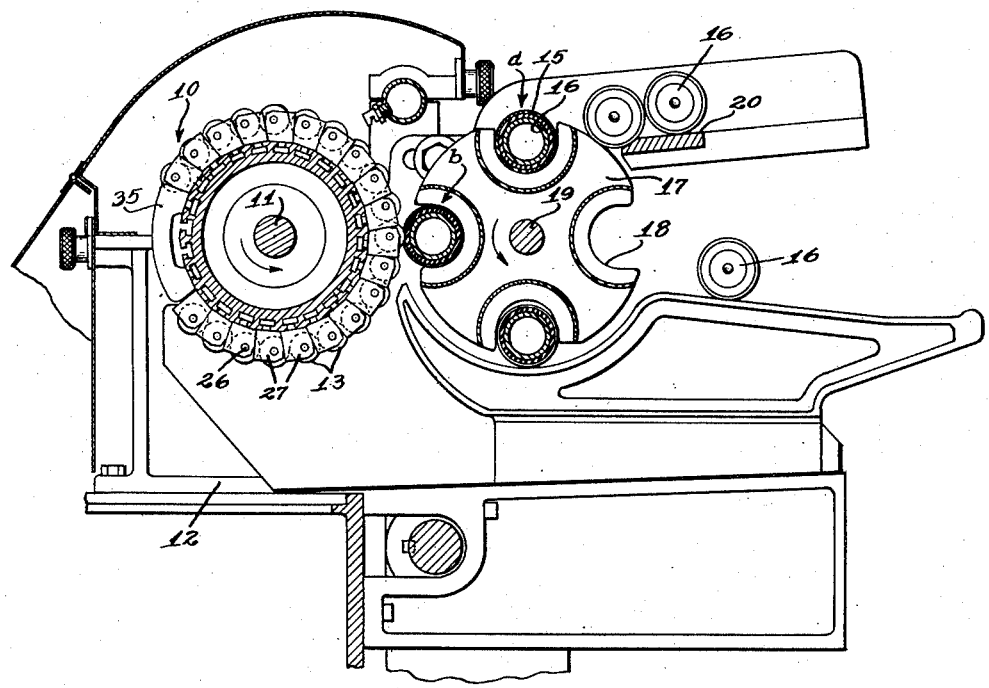
Fig. 1 is a cross-sectional elevation of the machine.

As shown in Fig. 1 the machine comprises a cutter carrier in the form of a drum or cylinder 10 mounted on a shaft 11 in the machine frame 12. The shaft 11 is intermittently driven for rotating the drum intermittently in a counterclockwise direction. Knives 13 in the form of disk cutters are mounted on the drum and arranged in spiral rows or series, each series extending circumferentially of the drum.

The tubes 15, of rubber or similar material, which are to be cut into gaskets are mounted on cylindrical cores or mandrels 16. A mandrel carrier 17 is formed with pockets or cradles 18 to receive the mandrels. The carrier shaft 19 is intermittently rotated step by step in a counterclockwise direction for bringing the mandrels with the tubes thereon in succession from a loading station $a$ to a cutting station $b$. The loaded mandrels 16 are placed on a platform 20. At each step rotation of the carrier 17 a mandrel 16 drops into a pocket 18 at the loading station and at the same time the preceding mandrel is brought to the cutter station $b$. The step rotations of the mandrel carrier are in alternation with the intermittent rotations of the cutter drum 10 so that the cutters operate while the carrier 17 is at rest. During the cutting operation the mandrels 16 are rotated at a comparatively high speed so that each cutter disk 13 completely severs a gasket from the tube before the next succeeding cutter in the same row or series is brought into contact with the tube.

The mechanism for rotating the cutter drum, mandrel carrier, and mandrels and for timing and controlling their movements may be the same as fully disclosed in my copending application above identified.

Figure 2:
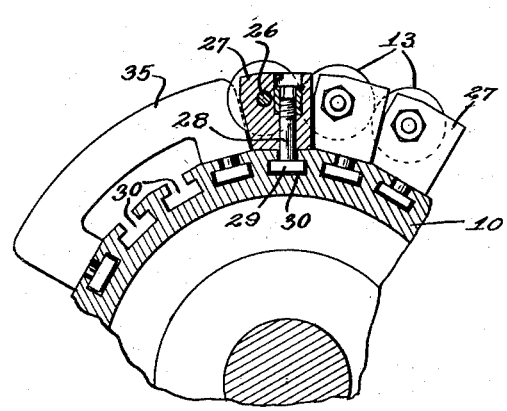
Fig. 2 is a fragmentary cross-sectional view of the cutter drum with disk cutters mounted thereon.
Figure 4:
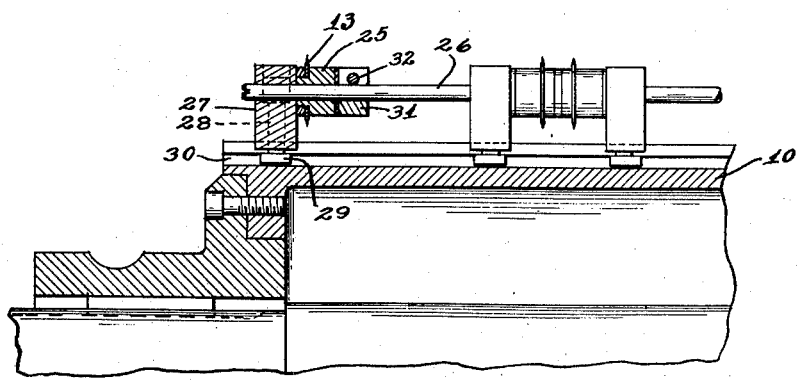
Fig. 4 is a fragmentary longitudinal section at the line 4—4 on Fig. 3, showing the cutter drum and cutters.

Referring to Figs. 2 and 4, the cutters 13 are in the form of disks mounted for free rotation on bearing blocks 25. The blocks 25 are mounted on rods 26 extending lengthwise of the drum and parallel therewith. The rods 26 are carried on cutter blocks 27 attached to the cutter drum. The blocks 27 are adjustable lengthwise of the drum and are clamped in adjusted position by means of clamping bolts 28. The heads 29 of the bolts are slidable in undercut grooves 30 in the cylinder 10.

Figure 3:
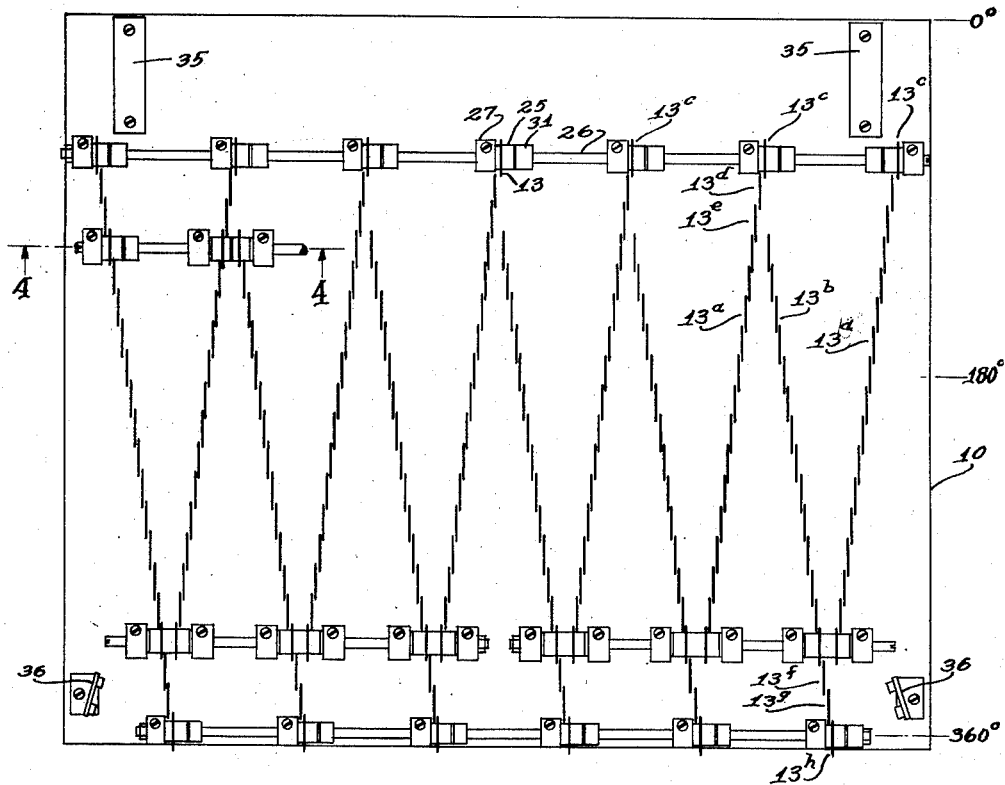
Fig. 3 is a development of the cutter drum illustrating diagrammatically the arrangement of cutters.

Clamping blocks 31, individual to the cutters 13 are releasably clamped to the rods 26 by screws 32 and serve to hold the cutters in adjusted position. The rods 26 may be of different lengths as indicated in Fig. 3. Each rod is of a length to extend through a plurality of the cutter blocks 27, holding them rigidly against any tilting movement or displacement.

Referring to Fig. 3, the knives 13 are arranged in a plurality of banks or groups. Each of these groups includes two rows or series $13^a$ and $13^b$ of cutters, each row being in spiral form extending circumferentially of the drum through a major portion of the circumference. Each two rows $13^a$ and $13^b$ are arranged in the form of a V. As shown, six banks or V-formations are arranged side by side on the drum. The end cutters $13^c$ at the upper or wide ends of the V's are all in a line parallel with the axis of the cutter drum and as shown are mounted on the same rod 26. With the arrangement shown each of the cutters $13^c$ is the end cutter of a row or series $13^a$.

The series of cutters do not extend throughout the entire circumference of the drum. Spacing bars 35, attached to the drum, bridge the empty space between the opposite ends of the banks of cutters and serve to hold the mandrel 16 in position in the cradle 18 while at the cutting station. The bridges 35 are at the cutting station while the cutter drum is at rest.

The drum 10 makes one complete rotation during each cutting cycle in which a tube 15 is cut into individual gaskets. At the beginning of the cycle the cutters $13^c$ operate simultaneously to make the first cuts, thereby severing the tube into lengths corresponding to the wide ends of the V-formations. As the cutter drum continues its rotation, cutters in the positions $13^d$ and $13^e$ operate to sever gaskets from the adjoining ends of the tube sections. Thereafter, each tube section has gaskets cut simultaneously from opposite ends thereof by the cutters in the respective rows 13a and 13b of the associated bank of cutters. The final cuts of each tube section are made by cutters of the spiral row 13b at the positions 13f, 13g, and 13h. In other words each row 13b of a bank of cutters is extended at the narrow end of the V beyond the row 13a. In like manner the row 13a at the wide end of the V is extended beyond the row 13b. This arrangement provides adequate room for mounting the individual cutters adjacent the ends of the rows.

The cutters are so positioned, arranged, and spaced that an entire tube 15, extending approximately the full length of the drum, is cut into gaskets of equal thickness or length as measured lengthwise of the drum, except the discarded ends. These ends are ejected from the drum by ejectors 36. The ejectors are in the form of blades mounted on the face of the drum in position to engage behind the severed ends of the tubes and are inclined in a manner to push or cam such severed ends outwardly and off the mandrel. The ejector blades have their leading ends substantially in line with the outermost cutters 13c.

Modifications may be resorted to within the spirit and scope of my invention.

I claim:

1. A machine for cutting tubes into short lengths, said machine comprising a cutter carrier mounted for rotation about an axis, a multiplicity of cutters arranged in rows on the carrier and with the rows extending spirally around the axis of the carrier, said rows being arranged to converge in a V-shaped formation, a mandrel with a tube mounted thereon, means for mounting the mandrel at one side of the cutter carrier and parallel with the said axis and holding the tube in position to be engaged by the cutters in succession during the rotation of the cutter carrier, with each cutter in one row engaging the tube concurrently with a cutter in the other row, thereby cutting rings concurrently from the opposite ends of the tube.

2. The machine defined in claim 1, the cutters in each row being uniformly spaced in the direction of said axis and also uniformly spaced lengthwise of the spiral row.

3. The machine defined in claim 2, the spiral rows of cutters being symmetrically arranged with respect to an intermediate plane normal to the said axis.

4. The apparatus defined in claim 1, the spiral rows being about equal in extent in the direction of their length, the said rows being less in extent than a complete convolution around the said axis.

5. The combination of a cutter drum, a multiplicity of cutters mounted on the drum and arranged in rows extending spirally circumferentially of the drum, said rows being arranged in pairs, each including two rows in V-formation, said pairs being arranged side by side with the cutters at the wide ends of the V-formations aligned in a row parallel with said axis, a mandrel with a tube thereon mounted for rotation about its axis at one side of the cutter drum and parallel therewith, the drum being mounted for rotation about its axis in a direction to bring the said aligned cutters first into contact with the said tube at a cutter station, thereby cutting the tube into lengths or sections individually to the V-formations, the cutters of each of said V-formations thereafter operating in pairs simultaneously to cut rings or gaskets from the ends of a tube section so that the forces applied to the tube in the direction of its length by the two cutters of each of said pairs are in opposite directions and thereby balanced, the rows of cutters thereby operating at the cutter station to cut each said length of tube progressively from the ends toward the middle.

6. In a machine for cutting tubes into short lengths or gaskets, a substantially cylindrical cutter drum, a multiplicity of cutters mounted on the drum, the cutters being arranged in spiral rows extending circumferentially of the drum, the said rows being arranged in alternate right and left-hand spirals, each two adjoining rows being in V-formation and the major portions of the cutters in each of said V formations being arranged in pairs with the two cutters of each pair at equal positions of advancement circumferentially of the drum, a mandrel for holding a tube mounted thereon, means for mounting the cutter drum and mandrel for rotation about parallel axes, means for simultaneously rotating the drum and mandrel, with the cutters in position to engage the tube and cut it into gaskets during said rotation, the direction of rotation of the drum and the position of the cutters thereon being such that the pairs of cutters in each of the said V formations operate in succession and progressively toward the point of the V, with the cutters of each pair operating to cut gaskets or rings simultaneously from the ends of a tube section.

7. The apparatus defined in claim 6, the said right-hand rows being substantially coextensive circumferentially of the drum, the left-hand rows being substantially coextensive circumferentially of the drum, the right-hand rows being offset relative to the left-hand rows in the direction of their length.

8. A machine for cutting tubes into short lengths, and machine comprising a cutter carrier mounted for rotation about an axis, a mandrel with a tube mounted thereon, said mandrel and carrier being mounted for rotation about parallel axes, a multiplicity of cutters arranged in rows on the carrier and with the rows extending spirally around the axis of the carrier, the rows being arranged to converge in a V-shaped formation, the cutters being arranged in pairs with the two cutters of each pair being in said rows respectively, means for concurrently rotating the said carrier and mandrel about their axes and thereby bringing the pairs of cutters in succession into cutting engagement with the tube, the cutters of each pair being positioned to engage and cut rings simultaneously from the opposite ends of the tube.

9. A machine for cutting a tube into short lengths or rings, comprising a mandrel on which the tube is mounted, groups of cutters, means for bringing the cutters of each group into engagement with the tube in succession, and causing them to cut rings from the tube the succession of cuts being made progressively from the outer ends of the tube toward the middle, the cutters of the two groups being operated to engage the opposite end portions of the tube concurrently and thereby balance the opposing forces applied by the cutters to the tube in the direction of its length.

References Cited in the file of this patent

UNITED STATES PATENTS

| | | |
|---|---|---|
| 1,348,316 | Perrault | Aug. 3, 1920 |
| 1,730,991 | Beason et al. | Oct. 8, 1929 |
| 2,696,883 | Broden | Dec. 14, 1954 |